US010366630B2

(12) United States Patent
Kusmec-Aguilar et al.

(10) Patent No.: US 10,366,630 B2
(45) Date of Patent: Jul. 30, 2019

(54) SYSTEM AND METHOD FOR SIMULATING COGNITIVE IMPAIRMENT

(71) Applicant: Innocorp, Ltd., Verona, WI (US)

(72) Inventors: Debra C. Kusmec-Aguilar, Verona, WI (US); Timothy Jorgensen, Verona, WI (US)

(73) Assignee: INNOCORP, LTD., Verona, WI (US)

( * ) Notice: Subject to any disclaimer, the term of this patent is extended or adjusted under 35 U.S.C. 154(b) by 431 days.

(21) Appl. No.: 15/008,117

(22) Filed: Jan. 27, 2016

(65) Prior Publication Data

US 2016/0217706 A1 Jul. 28, 2016

Related U.S. Application Data

(60) Provisional application No. 62/108,804, filed on Jan. 28, 2015.

(51) Int. Cl.
*G09B 23/28* (2006.01)

(52) U.S. Cl.
CPC .................................. *G09B 23/28* (2013.01)

(58) Field of Classification Search
CPC . G02B 5/22; G02B 5/20; G02B 7/006; G09B 23/28; G09B 9/00
USPC ......................................... 359/885, 891, 892
See application file for complete search history.

(56) References Cited

U.S. PATENT DOCUMENTS

| 4,079,411 A * | 3/1978 | Engelbrecht ......... G02B 5/1871 348/291 |
| 6,145,983 A | 11/2000 | Schiffer |
| 8,568,256 B1 * | 10/2013 | Richardson ........ A63B 69/0002 473/451 |
| 8,764,588 B2 * | 7/2014 | Gill ........................ A63B 43/06 473/465 |

OTHER PUBLICATIONS

Koehler, L. New Goggles Address Effects of Marijuana Use on Drivers [online] Jan. 27, 2015 [retrieved on Mar. 17, 2016], 4 pages. Retreived from the Internet <URL:http://fatalvlsion.com/news-events/2015/new-goggles-address-effects-of-marijuana-use-on-dnve rs/>.
International Search Report and Written Opinion from PCT/US2016/15152, dated Apr. 1, 2016, 10 pages.

* cited by examiner

*Primary Examiner* — Jade R Chwasz
(74) *Attorney, Agent, or Firm* — Quarles & Brady LLP; Yakov S. Sidorin

(57) ABSTRACT

System for simulating effects of impairment caused by recreational consumption of marijuana. The system includes i) an optical filter having a pre-defined spectral pass-band and a non-diffractive spatial pattern configured to deviate a beam of light incident onto the filter, and, optionally, ii) radiant objects at least one of which delivers light in a spectral band corresponding to color that is complementary to the color defined by the pass-band of the optical filter. Method for demonstration and analysis of impairment of cognitive function caused by using the system to affect the vision of the user.

17 Claims, 5 Drawing Sheets

SYSTEM AND METHOD FOR SIMULATING COGNITIVE IMPAIRMENT

CROSS-REFERENCE TO RELATED APPLICATION

This application claims the benefit of U.S. Provisional Application No. 62/108,804, filed Jan. 28, 2015, which is incorporated herein by reference in its entirety.

TECHNICAL FIELD

The present invention relates to a system and method configured to simulate the effect of impairment of cognitive functions and, more particularly, to a system and method configured to simulate the effects of the recreational use of marijuana.

BRIEF DESCRIPTION OF THE DRAWINGS

The invention will be more fully understood by referring to the following Detailed Description in conjunction with the generally not-to scale Drawings, of which.

Figure 1:
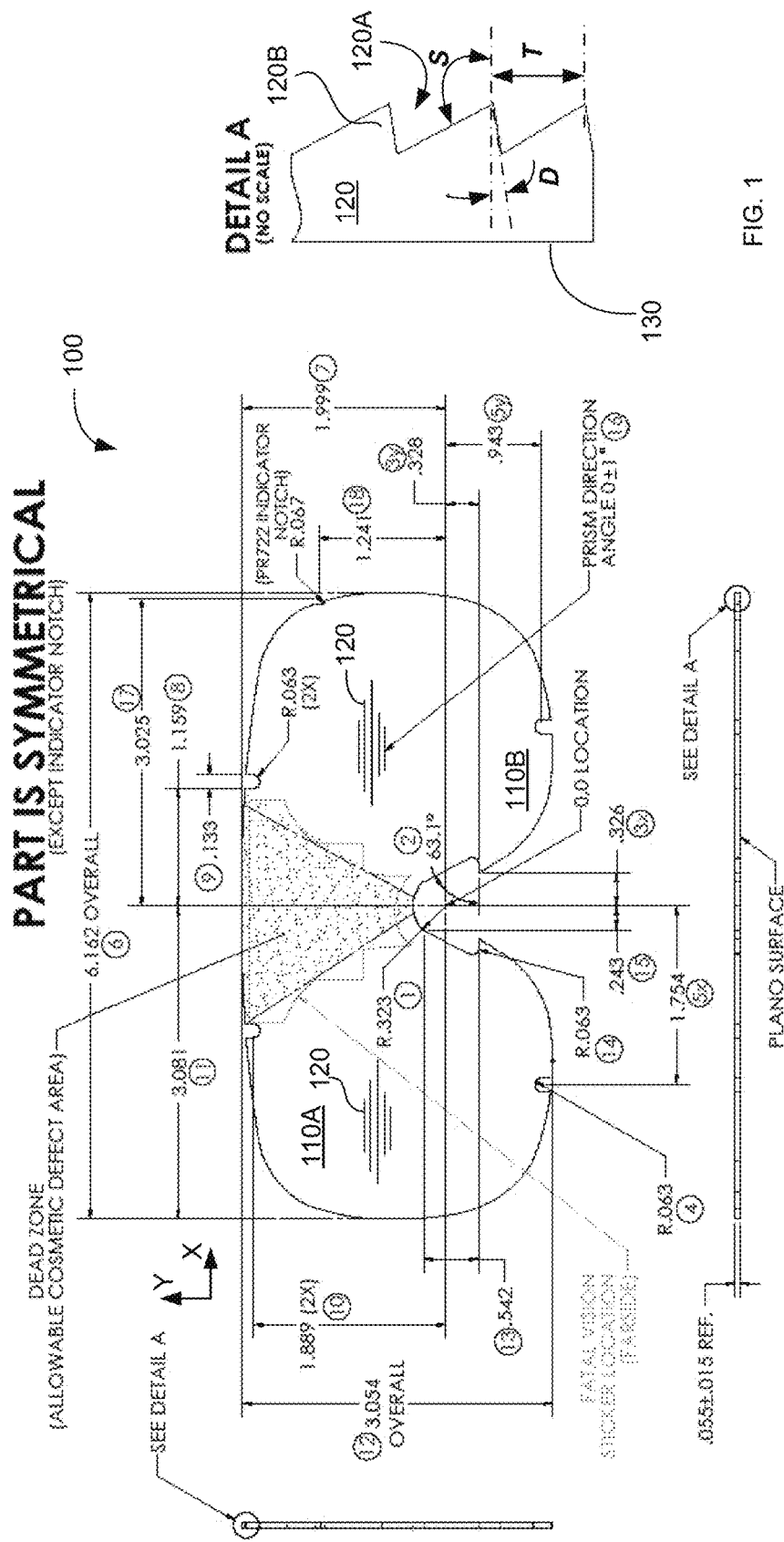
FIG. 1 is a schematic illustration of an optical system according to an embodiment of the invention.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

In accordance with the idea of the present invention, method and apparatus are disclosed for simulating effects of impairment of perception and response caused by consumption of the *cannabis* plant and, in particular, the effects of distorted perception of visual information, loss of motor coordination, and loss of reaction time to familiarize the user with the potential consequences of the *cannabis* consumption.

*Cannabis* is known to produce psychoactive and physiological effects when consumed. Aside from the most common short-term physical and neurological effects (among which there are increased heart rate, increased appetite and consumption of food, lowered blood pressure) and the immediate effects desired by a consumer (such as relaxation, mild euphoria, subjective changes in mood, the "high" or "stoned" feeling), the immediate undesired side-effects include alteration of visual perception, impairment of short-term and working memory, psychomotor coordination and concentration, decrease in short-term memory, dry mouth, impaired motor skills and reddening of the eyes.

Recreational use of marijuana (dried flowers and subtending leaves and stems of the female *Cannabis* plant) has been shown to impair cognitive functions on a number of levels—from basic motor coordination to more complex executive function tasks, such as the ability to plan, organize, solve problems, make decisions, remember, and control emotions and behavior. The effect produced by using an embodiment of the invention is to give the user an experience of cognitive impairment associated with the recreational marijuana use and demonstrate the susceptibility of the user to this impairment and the degree of potential consequences that may occur, in one instance—the cognitive effects on motor skills.

A problem of practical simulation of cognitive impairment caused by the use of marijuana is solved by exposing a user to perceiving the ambient environment through an optical filter system configured to distort the vision of the user within the field of view (FOV) such as to i) deviate a line of sight of the user in comparison with the default line of sight existing in absence of the optical filter system and ii) removing at least one color, as perceived by the user looking at the ambient environment through the optical filter system, from the color gamut that characterizes the ambient. The optical filter system is judiciously structured such as to avoid a pre-conceived notion, of a user looking at the optical filter system, that the use of the system is going to affect the visual perception of the ambient. For example, the optical filter system is configured to be transparent, with minimal scattering of light, to allow imaging of objects in light passing therethrough. A set of actions, performed by the user perceiving the ambient through the optical filter system, is designed to compare the results of such actions with results that would be achieved in absence of the optical filter system and analyze the effects of impairment simulation.

According to the idea of the invention, a system for simulating cognitive impairment by affecting a vision of a user includes an optical filter system having a spatially two-dimensional optical filtering function. The system also includes at least one radiant object that has a corresponding spectral characteristic and is configured to deliver light at a respectively corresponding wavelength, whether by emitting such light (and being a source of light itself) or by reflecting light incident onto the radiant object from the ambient environment. In the latter case, the radiant object is passive and delivered reflected light within a spectral band defined by the spectral band of the light incident onto the object and the reflectance characteristics of the object. In practice, the operation of the system includes performing various actions involving the radiant object while looking at the ambient and/or the radiant object through the optical filter system.

Optical System and Auxiliary Tools.

Embodiments of the system of the invention include an optical system and several auxiliary tools such as, for example, radiant objects.

FIG. 1 illustrates an implementation 100 of the optical filter system of the present invention, which is shown formatted as goggles in which each of the lenses 110A, 110B includes a spectral optical filter having a pass-band characterized by a central wavelength. The spectral characteristic of the lenses 110A, 110B is substantially the same across the lenses within their bounds. The lenses can be made of glass or a flexible plastic sheet. In the latter example, the typical thickness of the lenses is about 0.05 inches. Due to the parameters of the spectral transmission, the lenses are perceived by the user as optically transparent elements the color of which is substantially the same at any point within the bounds of the lenses. It is notable that, according to the idea of the invention, both the spectral pass-band of a spectral filter of the embodiment and the central wavelength of such pass-band are judiciously defined in operational correspondence with the spectral characteristics of at least one of the two radiant objects of the embodiment, as discussed below.

Coordination of Spectral Characteristics of Optical System and Auxiliary Tools.

Figure 5:
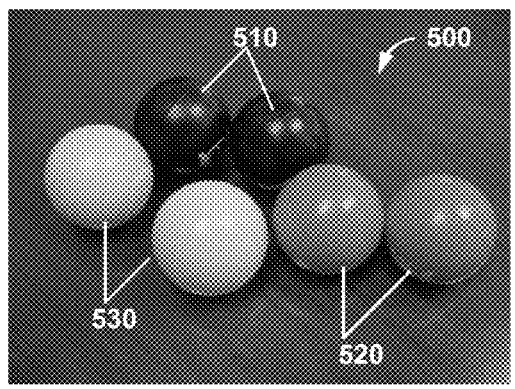
FIGS. 5, 6, 7, 8, and 9 show various radiant objects and auxiliary tools.
Figure 6:
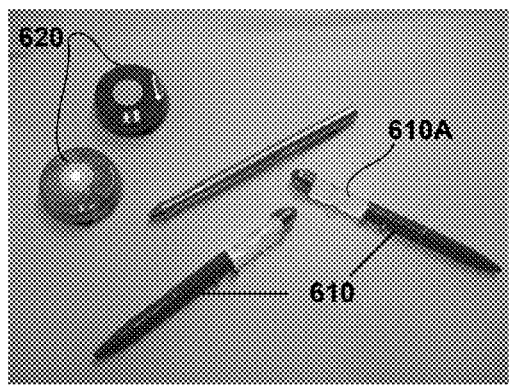
Figure 7:
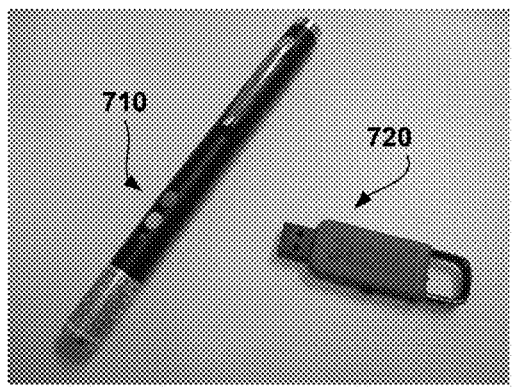

FIGS. 5, 6, and 7 illustrate embodiments of various radiant objects according to the idea of the invention. The term radiant as used in this disclosure refers to either the active quality of emitting rays of light or a passive characteristic of being bright and/or shiny. As shown in FIG. 5, for example, the radiant object includes balls 500 (or, alternatively, radiant elements shaped differently) that are colored (by pigmentation, for example) in strict correlation with the spectral pass-band of the optical filter(s) of the invention. Specifically, the coloration of at least one of the elements 500 is chosen within the spectral band chosen such as to define, in reflection of ambient light incident onto the radiant element, a color that is complementary to the color defined by the spectral pass-band of the optical filter of the invention. Complementary (or opposite) colors as used in this disclosure are pairs of colors which, when combined, cancel each other out. This means that when a given radiant object that is colored in a fashion complementary to the spectral characteristic of the optical filter of the invention is viewed through such filter, the radiant object is perceived as black. As shown in FIG. 5, the balls include two black balls 510, two red balls 520, and two orange balls 530.

The units having complimentary colors, when placed next to each other, create the strongest contrast for those particular two colors. In one non-limiting example, the embodiment of the system of the invention includes optical filters providing high level of transmission in the green portion of the spectrum and blocking light in the red portion of the spectrum, while at least one radiant object is colored red. Other pairs of complementary colored can be used such as yellow and violet, or blue and orange, for example.

In a related embodiment, the radiant object may include a source generating light within the spectral band that is complementary to the spectral band of the optical filter(s) of FIG. 1. In reference to FIGS. 6 and 7, the sources of light can be configured to generate light continuously or in a modulated (flashing) fashion. For example, sources of light may include a pen 610 containing an LED 610 that is wired to operate in a flashing regime or in a continuous regime, at user's discretion; a laser pointer 710 including one or more laser diodes at least one of which generates light within the band complimentary to the pass-band of the optical filter 110A, 110B; or just a simple light source 620 (an LED, for example) configured to operate either continuously or flashing. The source of light can be part of a digitally projected video image, wherein certain pixels or portions of the image can radiate light within the appropriate complementary spectral band.

Figure 2A:
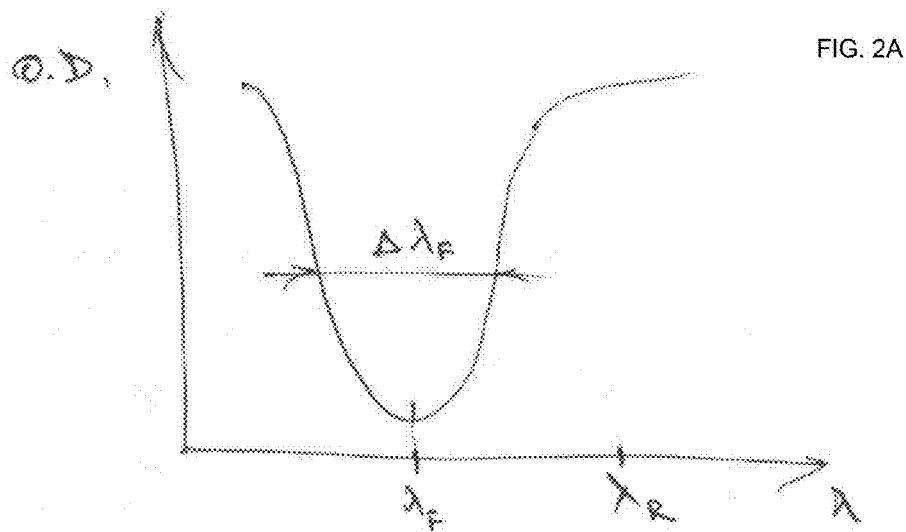
FIG. 2A is a schematic plot providing illustration to a choice of the spectral characteristic of an optical filter in reference to that of a radiant object of an embodiment.
Figure 2B:
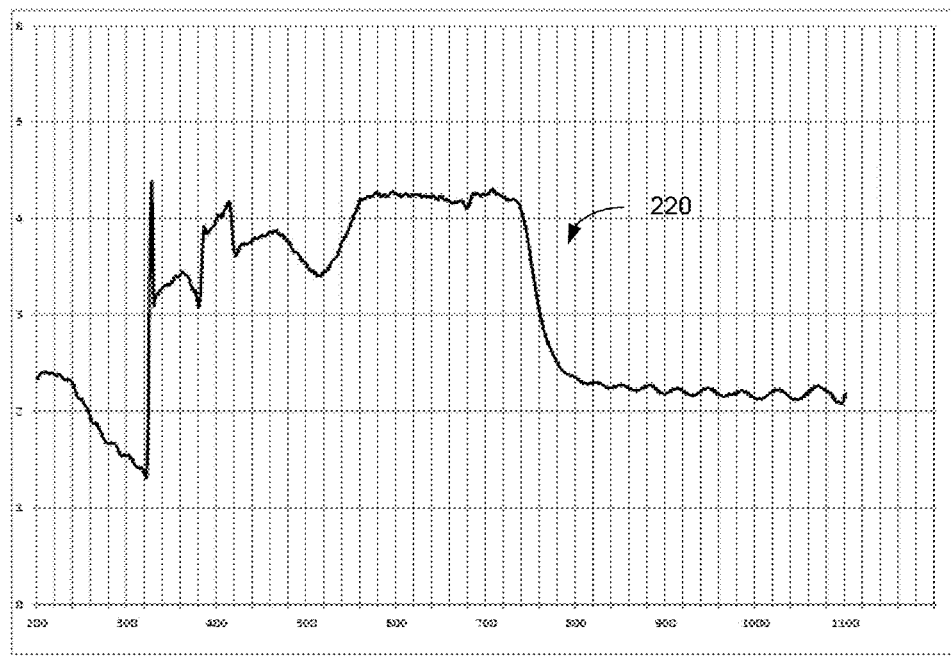
FIG. 2B is a plot showing an empirically-measured spectral characteristic of an embodiment of the optical filter.
Figure 2C:
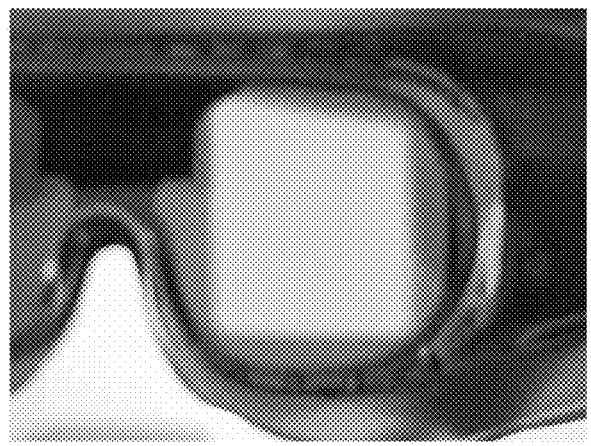
FIG. 2C provides an image of a white field obtained through an optical filter of the invention to illustrate the spectral effect produced by the optical filter.

An example of one operationally sufficient spectral characteristic 200 of the optical filter(s) of the invention is schematically presented in FIG. 2A with indication of relative coordination of the parameters ($\lambda_F$, $\Delta\lambda_F$), which define the absorption of optical filters 110A, 110B, and the wavelength $\lambda_R$ that is associated with the color of a radiant object. The color defined by the pass-band $\Delta\lambda_F$ and/or the wavelength $\lambda_F$ is complementary to that associated with $\lambda_R$. It is appreciated that in practice, when an optical filter of the invention exhibits sufficiently large (for example, several-fold) difference between the transmission of light at complementary wavelengths, the operational goal of using such optical filters in an embodiment of the invention will be achieved. A measured spectral characteristic 220 of the optical filters 110A, 110B is shown in FIG. 2B. While not necessarily optimized, the spectral curve 220 illustrates that the level of transmission in the green portion of the visible spectrum is on the order of magnitude (or at least several times) smaller than that in the red portion of the visible spectrum. In practice, such optical filter(s) sufficiently block transmission of red light from the radiant objects. FIG. 2C illustrates an image of white field viewed as green in transmission through an embodiment of the optical filter.

Spatial Characteristics of Optical Filter(s).

In addition to pre-determined spectral pass-band of the filters 110A, 110B, each of the filters contains an additional spatial pattern at a body of the optical filter. The spatial pattern is judiciously configured to define different phase delays for two different light beams that propagate through the optical filter at different points.

Referring again to FIG. 1, a non-limiting example of such pattern is shown in inset as a prismatic surface-relief structure 120 defined at the surface of each of the filters 110A, 110B by rulings 120A (which may be spatially periodic or non-periodic). As shown, the prismatic structure is periodic and includes linear rulings/grooves separated by the prismatic elements 120B that extend, substantially, across the whole clear aperture of the filters 110A, 110B. While the direction in which the prismatic structures 120B (and the rulings 120A) are extended substantially coincides with a horizontal direction as defined by the use of the goggles 100 (and shown as the x-axis in FIG. 1), it is appreciated that a related embodiment with certain angular deviation between the direction of the rulings 120A and the x-axis, possible in practice, is still within the scope of the invention. An example of such deviation is indicated in FIG. 1 as +/−1 degree, but in practice can be several degrees, for example +/−5 degrees or even within the range of +/−10 degrees.

Figure 3:
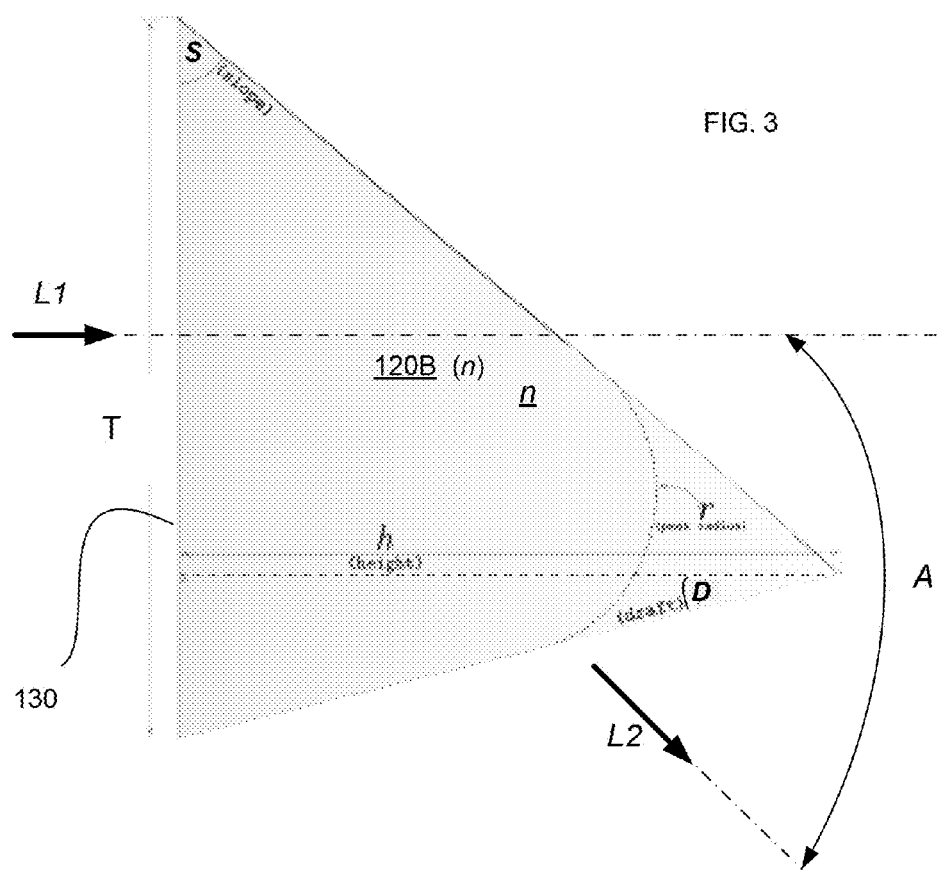
FIG. 3 is a diagram illustrating a prismatic element of a surface-relief pattern of an optical filter according to an embodiment.

The spatial pattern 120 of the optical filters 110A, 110B in the example of FIG. 1 is defined by the period T, the slope angle S (an angle between a facet of an element of the prismatic structure with respect to the planar surface 130 of the optical filter 110A, 110B), the draft angle D, and the height h. FIG. 3 provides a schematic illustration of a single prismatic element 120B of the prismatic structure 120, which has a refractive index n. In one example, the period T is about 150 microns, the slope angle S is about 19°, and the draft angle D is minimized (the residual draft angle may be about a couple of degrees or so, which is defined by the process of manufacture of the prismatic structure 120). A person of ordinary skill in the art will appreciate that the degree of uncertainty in specifying these values denoted is determined, on the one hand, at least by the practical limitation of equipment used to fabricate the spatial pattern and, on the other hand, by a need to satisfy the "stealthy" appearance of the pattern to the naked eye of the user. For example, it may be preferred that the period T of the pattern is chosen such as to not produce any visually perceivable optical effects (such as the optical diffraction effect) when viewed by the user. At the same time, the period T should be such as to be not easily discernible. Accordingly, in one embodiment the value of T could exceed the wavelength of visible light while being smaller than, for example, a millimeter.

Figure 4A:
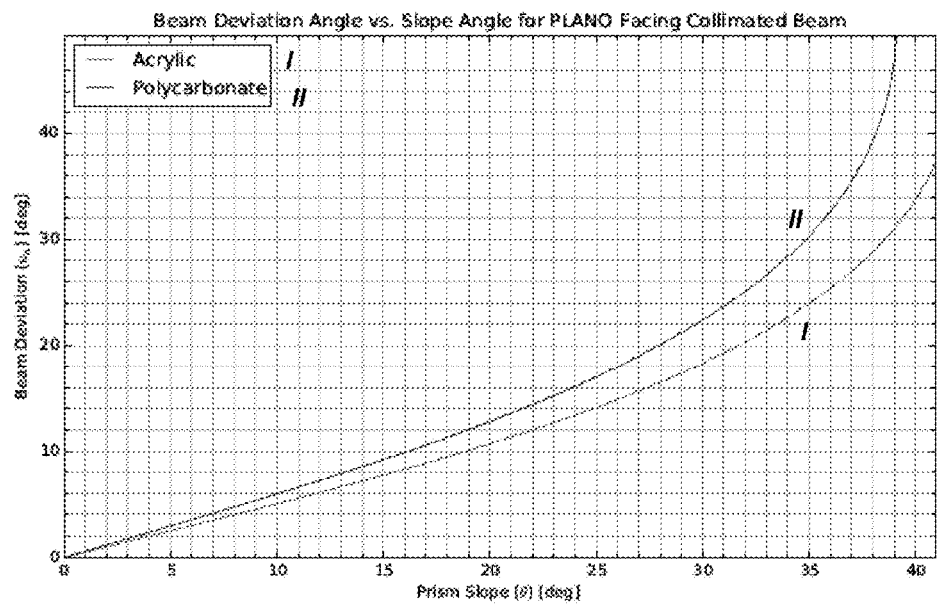
FIGS. 4A and 4B provide plots illustrating theoretical dependence of angle of deviation of the beam of light incident onto the optical filter configured according to the embodiment of FIG. 1, for different orientations of the optical filter with respect to such beam of light.

In reference to FIG. 3, for a collimated beam of light L1 incident normally onto a plano-prismatic optic such as the element 120B, the angle of deviation A of the throughput light beam L2 from the direction of incidence may be calculated as a function of the slope angle S. The dependence of angle A on the slope angle differs depending on whether the collimated beam impinges from the ambient on the planar surface 130 of the optical filter 110A (as shown in FIG. 3) or on the surface of the prismatic structure (in other words, on the orientation of the optical filter with respect to incident light). In the case of FIG. 3, in which the planar side 130 of the optical filter 110A, 110B faces in input light L1, a the value of the angle of deviation A is defined as $$A = \arcsin\left\{\frac{q}{q^2+1}\left[-n + \sqrt{1-(n^2-1)q}\,\right]\right\} \quad (1)$$

where q=tan (S). FIG. 4A illustrates this dependence of the angle A on the angle S for two materials (acrylic, I; and polycarbonate, II). In the case in which light L1 from the ambient is incident onto the prismatic surface of the optical filter 110 (which, in the coordinates of FIG. 1 corresponds to the surface relief structure 120 being disposed at the surface of the lenses facing the user, in operation), the deviation angle can be shown to follow $$A = \arcsin\left\{\left[\frac{-q}{q^2+1} + \sqrt{\frac{q^2}{q^2+1} + \left(\frac{1}{q^2+1}n^2 - 1\right)}\,\right]\right\} \quad (2)$$

Figure 4B:
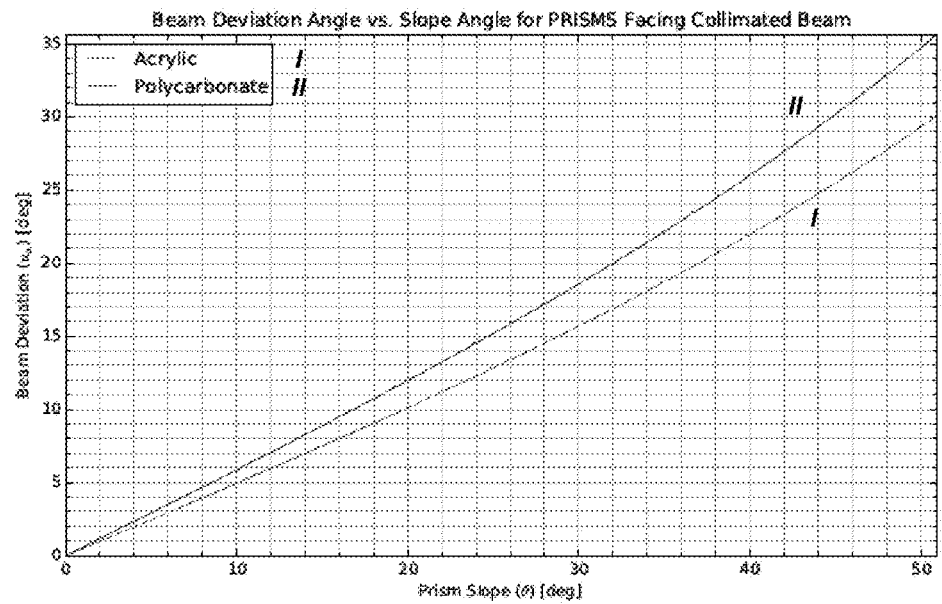

FIG. 4B illustrates this dependence of the angle A on the angle S for two materials (acrylic, I; and polycarbonate, II).

As follows from FIGS. 1 and 3, the prismatic structure 120 is configured to cause the user wearing the optical filter(s) 110A, 110B in front of his eyes to change his line of sight and look upwardly (into the beam L2) when perceiving the ambient environment through the optical filters, which correlates with behavior of a person under the influence of recreational marijuana and/or correlates with a slight sensation of impairment of such person. Depending on the desired strength of this effect (i.e., depending on the desired, angle of deviation A), the slope angle S may be changed within the appropriate limits the examples of which are illustrated in FIGS. 4A, 4B.

It is appreciated that, in a related embodiment, the pattern 120 can be formed in the body of the optical filters as a phase-based element (for example, by structuring the bodies of the optical filters to contain an array of linear bands or areas the refractive index of which differs from that of the surrounding portion(s) of the filters 110A, 110B).

In contradistinction with optical filters of related art (which feature translucent filters), the embodiments of the present invention include filters that are optically-transparent and have a spectral characteristic (such as a pass-band, for example) that is invariable as a function of the position across the filter. Optical transparency is known to be the physical property of allowing light to pass through the material without being scattered. On a macroscopic scale (one where the dimensions investigated are much larger than the wavelength of light in question), Snell's law is followed. To the contrary, the property of translucency allows light to pass through without following (again, on the macroscopic scale) Snell's law; the photons can be scattered at either of the two interfaces where there is a change in index of refraction, or internally. In other words, a translucent medium allows the transport of light while a transparent medium not only allows the transport of light but allows for image formation. As discussed above, embodiments of the present invention also contain a physical pattern (such as a surface prismatic structure 120 or its phase-structure analog formed by the variation of the refraction index) that is a linear function of a spatial coordinate along a surface of the filter, judiciously configured to ensure that light incident onto the optical filter from the ambient is deviated from its original direction of propagation and re-directed in the same new direction regardless of a point of incidence of the ambient light onto the filter. Such physical pattern is extended along a straight line.

Additional System Components.

Figure 8:
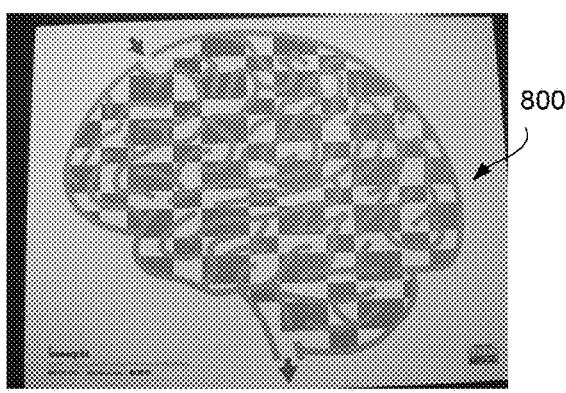

An embodiment of the invention may additionally include a maze 800 drawn on a pad (FIG. 8), different portions of which may have complementary colors associated with the spectral characteristics of the optical filters and used for simulating of impairment of executive function; a video (for example, on a tangible non-transitory storage medium such as a flash-drive 720, FIG. 7) containing various driving scenes used for illustration of the road condition to the user and simulation of the impairment of the reaction time, visual perception, and response; and/or a grid-mat 900 (FIG. 9) with a road pattern on it that is used, in conjunction with a least one of the radiant objects 910, for simulation of the impairment of the effect of marijuana on the short-term memory of the user. Alternatively, the maze 800 can be provided on a surface that permits reuse after cleaning. The maze can be permanently or semi-permanently provided on the surface. For example, the maze 800 can be printed onto a reusable whiteboard surface, which can itself be portable or fixed, such as to a wall or table.

EMBODIMENTS OF METHOD

Example 1: The Use of a System for Simulating a Distorted Perception of Visual Information and Missing Important Visual Clues According to an embodiment of the method of the invention, the user is caused to catch, one at a time, several radiant objects 500 each of which is shielded from his view until tossed to the user. The chosen radiant objects reflect light of the ambient in different spectral bands, with at least one of the objects being characterized by a color that is complimentary to the color defined by the pass-band of the optical filters of the invention. For example, when the pass-band of the optical filters of the invention is defined in the green portion of the spectrum, some of the radiant objects 500 may be red, some orange, and some black. During the process, the task is defined as catching only the black objects and avoiding the red and the orange ones. The correctness of the choices in determining the color of the objects to be caught made by the user who perceives the environment with a naked eye is compared with the results of a similar experiment when the user is asked to look at the ambient environment through the optical filters 110A, 110B (which may be used in the goggles 100). It is appreciated that the user cannot correctly discern the color of the objects 500 through the optical filters 110A, 110B, as the red balls are perceived through the green filters as being black, and therefore makes more mistakes in trying to catch only the black balls. This test stimulates the cognitive impairment of not recognizing and responding to sensory input that results from recreational marijuana use.

Example 2: The Use of a System for Simulating a Disruption of Executive Functions for Example, Short-Term Memory and Decision-Making Skills)

This embodiment of the invention illustrates the impact of this impairment on an attempt to solve the maze 800. At the first step, the maze is shown to the user in the video or demonstrated otherwise. The user is then asked to pick a radiant object including a flashing source of light (such as a pen 610 of FIG. 6) and to complete the maze provided on paper, optionally recording the time it takes to complete the maze. Once finished, the user is asked to complete the maze while observing it through the goggles (or just the optical filters) of the invention. The results of these two experiments may be compared and contrasted, during the discussion, to identify confusion, hesitation, and difficulty remembering decisions for completing the maze that have been made prior to wearing the goggles.

Example 3: The Use of a System for Simulating a Loss Attention and Distorted Perception of Visual Information The use of marijuana filters the FOV from which the consumer draws and uses information, especially while driving, while there is nothing physically wrong with the user's ability to see. At the same time, the consumption of marijuana causes the consumer to focus more on only one sensory input at the expense of other sensory inputs. For example, the user concentrates harder of what is seen in front of him and pays less attention to hearing or seeing at the periphery of his FOV.

According to this embodiment of the invention, the object of the test includes a typical driving scenario and items typically seen in a driving situation and is demonstrated to the user on video. The dual laser pointer (such as the pointer 710 containing the red and green laser sources, for example) is used to point from object to object in the driving scene with the purpose of identifying them verbally. The objects in the driving scene are highlighted with the dual laser pointer randomly and with light beams that are randomly switched from red to green. Following this initialization step, the user is caused to look at the ambient through the optical filters (for example, wear the goggles) configured according to the idea of the invention and has to identify the objects pointed to in the similar fashion. In the latter case, the user does not perceive those objects that are pointed to with a red laser beam when wearing the green optical filters due to the mutual cancellation of the complimentary colors, which demonstrates how being unaware of subtle environment changes can lead to being unprepared for a sudden traffic event.

Example 4: The Use of a System for Simulating a Loss of Reaction Time, Attention, and a Distorted Perception of Visual Information According to an embodiment of the invention, the initialization of this activity is similar to that in Example 3. The driving scenario video is shown to user(s) on the screen. Some of the users are made to look at the ambient environment through the optical filters (for example, wear the goggles 100), while others are observing the scene with a naked eye. Participants wearing the goggles of the invention are asked to use the green laser pointer to point at the brake button on the screen to simulate "hitting the brake" each time they perceive that the traffic conditions require braking or covering the brake. Participants not wearing the goggles are asked to use red laser pointers to point at the brake button each time they perceive that the traffic conditions require braking or covering the brake. The red laser spots on the screen will not be seen by the participant(s) wearing the goggles. The results of both tests and, in particular, the difference in reaction time required for the two groups of participant to react to changes in the traffic conditions are then analyzed to identify missed, delayed, or incorrect braking in the traffic conditions done by a given participant.

Figure 9:
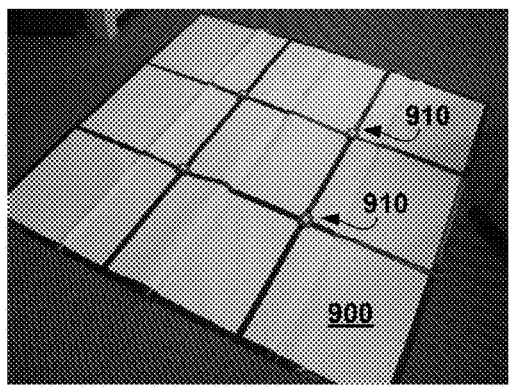

Example 5: The Use of a System for Simulating Impairment of Motor Skills, Memory, and Decision Making Abilities According to an embodiment, the grid mat having a square pattern on it is laid out on the floor, and sources of light 620, 910 some of which are configured to generate light in a flashing/blinking fashion are positioned on the intersections of the square pattern, as schematically shown in FIG. 9. Initially, the user is given time to study the grid with a naked eye and to memorize the intersections with the blinking activity light on. At the next step, the user is asked to put the goggles on and walk the grid identifying, through the optical filters of the invention, which lights are blinking and which are not. The spectrum of light generated by the blinking sources of light corresponds to color that is substantially complementary to the color defined by the spectral pass-band of the optical filters of the invention. Comparison of the results of the identification of the blinking lights on the grid through the optical filers of the invention with those perceived with the naked eye demonstrate the reduced confidence in remembering the lights as being on or off before the user puts the goggles on. The results are discussed with the user to illustrate the impact that short-term memory lapses can have in various situations where the mobility of a person is affected by the use of marijuana (such as driving, walking, biking, for example).

In accordance with examples of embodiment, system and method for simulating the impairment caused by consumption of marijuana have been described. These examples can be appropriately modified without changing the scope of the invention. While specific values chosen for an embodiment of the system are recited, in reference to FIGS. 1, 2A, 2B, 3, 4A, 4B it is to be understood that, within the scope of the invention, the values of all of parameters may vary over wide ranges to suit varying applications. Disclosed aspects, or portions of these aspects, may be combined in ways not listed above. Accordingly, the invention should not be viewed as being limited to the disclosed embodiment(s).

The invention claimed is:
1. A system for simulating cognitive impairment of a user, the system comprising:
    a pair of goggles containing:
        a first optical filter element having first and second spatial dimensions and an optical filtering function with a spectral pass-band around a first wavelength; and
        a second optical filter element having the first and second spatial dimensions and the optical filtering function;

wherein said optical filtering function is invariable with respect to a position across the first optical filter and across the second optical filter;

a first radiant object configured to reflect light at a second wavelength, wherein the first and second optical filter elements are configured to block light at the second wavelength;

a second radiant object configured to reflect light at a third wavelength within the spectral pass-band, wherein a color defined by the third wavelength is complementary to a color defined by the second wavelength;

a first light-generating source configured to generate light at a fourth wavelength, wherein a color defined by the fourth wavelength is complementary to a color defined by at least one wavelength within the spectral pass-band;

a second light-generating source configured to generate light at a fifth wavelength, wherein the fifth wavelength defines a color that is complementary to a color defined by the at least one wavelength outside the spectral pass-band; and a substrate bearing a graphic representation of a maze;

wherein at least a first portion of the graphic representation is configured to reflect light at a first set of wavelengths, wherein wavelengths from the first set of wavelengths define corresponding colors that are complementary to at least a first color, the first color being a color complementary to a color defined by a wavelength within the spectral pass-band; and wherein at least a second portion of the graphic representation is configured to reflect light at a second set of wavelengths, wherein wavelengths from the second set of wavelengths define corresponding colors that are complementary to at least a second color, the second color being a color complementary to a color defined by a wavelength outside the spectral pass-band.

2. A system according to claim 1, wherein a chosen optical filter element from said first and second optical filter elements includes a pattern in a body of said chosen optical filter element, the pattern defining different phase delays for first and second collimated light beams that propagate through said chosen optical filter element, said first light beam having a chosen wavelength within the spectral pass-band and being incident normally onto the chosen optical filter element at a first point, said second light beam having the chosen wavelength and being incident normally onto the chosen optical filter element at a second point, the first and second points being different from one another, wherein the first and second optical filter elements have a refractive index n at the chosen wavelength;

wherein a period of the pattern is chosen so at to not produce an optical diffraction effect when irradiated with visible light.

3. A system according to claim 2, wherein said first radiant object includes a first unit colored by pigmentation of said first unit, said pigmentation of the first unit defining the first wavelength of light reflected by the first unit, and wherein the second radiant object includes a second unit colored by pigmentation of said second unit, said pigmentation of the first unit defining the second wavelength of light reflected by the second unit.

4. A system according to claim 3, wherein said first and second optical filter elements are configured as lenses of said goggles and wherein, when said goggles are worn in operation such that the first unit is separated from an eye by the lens, light that has been delivered from the second unit is not visually perceivable through said lenses.

5. A system according to claim 2, wherein said pattern in the body of the chosen optical filter element is defined by a relief structure on a surface of said chosen optical filter element.

6. A system according to claim 2, wherein said pattern is defined by a spatially-periodic prismatic structure.

7. A system according to claim 2, wherein said pattern in the body of the chosen optical filter element is defined by a spatial distribution of a refractive index non-uniformity, and wherein the chosen optical filter element has a thickness that is uniform within bounds of the chosen optical filter element.

8. A system according to claim 1, further comprising a grid-mat containing a pattern representing a road.

9. The system of claim 8, wherein the pattern representing the road comprises:

a first plurality of first lines and a second plurality of second lines, the first lines being substantially transverse to the second lines to form a set of intersection points at intersections of the first and second lines.

10. The system according to claim 9, wherein each of two or more light-generating sources, including at least one of the first and second light-generating sources, is configured (i) to generate light periodically in a blinking fashion when in an "on" state and (ii) to not generate light when in an "off" state; and wherein, when said two or more light-generating sources are disposed at respectively corresponding intersection points from the set of intersection points, viewing of said two or more light-generating sources through the pair of goggles causes a reduction of confidence of the user in remembering whether a chosen light-generating source in the "on" state or in the "off" state at the time preceding said viewing.

11. A system according to claim 1, wherein the first color is a color defined by the second wavelength.

12. A system according to claim 1, wherein an optical filter element from said first and second optical filter elements includes a pattern in a body of said optical filter element, wherein a period of the pattern is chosen so at to not produce an optical diffraction effect when irradiated with visible light.

13. A system according to claim 1, wherein said first optical filter element is configured to substantially completely absorb light that has been delivered from the first radiant object to the first optical filter element upon transmission of said light through the first optical filter element, said spectral pass-band being the same at any spatial point across the first optical filter element.

14. A system according to claim 1, wherein said first optical filter element is configured to be detachably affixable to a head of the user in proximity of an eye so as to have all light entering the eye from an ambient pass through said first optical filter element.

15. The system of claim 1, wherein each of the first and second light-generating sources is configurable by the user to be in one of the "off" state and the "on" state, wherein in the "off" state a chosen light-generating source does not generate light, and in the "on" state the chosen light-generating source is configured to generate light periodically in a blinking fashion.

16. A system for simulating cognitive impairment of a user, the system comprising a first optical filter element having an optical filtering function with a spectral pass-band around a first wavelength, wherein said optical filtering function is present at every point across the first and second dimensions of said first optical filter element, wherein the first optical filter element is defined by:
  i) the optical filtering function that is spatially-invariable within bounds of said first optical filter element, and
  ii) a spatial pattern at a body of the first optical filter element, the pattern defining different phase delays for first and second collimated light beams that are incident normally at the first optical filter element at different points and propagate through the first optical filter element, a period of the pattern chosen so at to not produce an optical diffraction effect when irradiated with visible light;

the system configured as goggles that cause the cognitive impairment of the user when worn by the user to observe an environment, said first optical filter configured as a first lens of said goggles.

17. The system of claim 16, wherein the system further comprises a second optical filter element having the optical filtering function with the spectral pass-band around the first wavelength, the second optical filter element configured as the other lens of the goggles.

* * * * *